United States Patent

Inoue

[15] 3,694,674

[45] Sept. 26, 1972

[54] HIGH VOLTAGE GENERATING APPARATUS

[72] Inventor: Keiji Inoue, Yokohama, Japan

[73] Assignee: Denki Onkyo Company Limited, Tokyo, Japan

[22] Filed: Sept. 25, 1970

[21] Appl. No.: 75,603

[30] Foreign Application Priority Data

| | | |
|---|---|---|
| Sept. 29, 1969 | Japan | 44/92983 |
| Sept. 29, 1969 | Japan | 44/92984 |
| Sept. 29, 1969 | Japan | 44/92985 |
| Sept. 29, 1969 | Japan | 44/92986 |
| Sept. 29, 1969 | Japan | 44/92316 |
| Sept. 29, 1969 | Japan | 44/92317 |

[52] U.S. Cl. ......................310/8.2, 174/52, 310/9.4, 310/9.8

[51] Int. Cl. ..............................................H01v 7/00

[58] Field of Search............................310/8–8.3, 8.7, 310/8.9, 9.5–9.8, 9.1, 9.4; 174/50, 54, 52, 138 G

[56] References Cited

UNITED STATES PATENTS

| | | | |
|---|---|---|---|
| 2,975,354 | 3/1961 | Rosen | 310/8.1 UX |
| 3,331,970 | 7/1967 | Dundon et al. | 310/9.1 |
| 3,500,131 | 3/1970 | Seeley et al. | 174/52 X |
| 3,499,096 | 3/1970 | Beecher | 174/52 |
| 3,252,109 | 5/1966 | White | 310/8.9 X |
| 3,113,223 | 12/1963 | Smith et al. | 310/9.1 X |
| 3,423,780 | 1/1969 | Curran et al. | 310/9.1 X |
| 3,087,982 | 4/1963 | Hayes | 174/52 |

*Primary Examiner*—R. F. Staubly
*Assistant Examiner*—B. A. Reynolds
*Attorney*—Chittick, Pfund, Birch, Samuels & Gauthier

[57] ABSTRACT

In a high voltage generating apparatus comprising a piezoelectric transformer element for generating a high AC voltage and a voltage step-up rectifier connected to the output electrode for generating a high DC voltage, there is provided a casing divided into two compartments by means of a partition wall for containing the piezoelectric transformer element and the rectifier respectively. Sealing means is provided between the periphery of the partition wall and the inner surface of the casing to electrically isolate the piezoelectric transformer element from the voltage step-up rectifier.

8 Claims, 19 Drawing Figures

PATENTED SEP 26 1972

3,694,674

SHEET 1 OF 4

INVENTOR

KEIJI INOUE

BY Chittick, Pfund, Birch, Samuels & Gauthier

ATTORNEY

INVENTOR

KEIJI INOUE

BY Chittick, Pfund, Birch, Samuels & Gauthier

ATTORNEY

INVENTOR

KEIJI INOUE

BY Chittick, Pfund, Birch, Samuels & Gauthier
ATTORNEY

INVENTOR

KEIJI INOUE

BY Chittick, Pfund, Birch, Samuels & Gauthier
ATTORNEY

HIGH VOLTAGE GENERATING APPARATUS

CROSS-REFERENCE TO RELATED APPLICATION

This application relates to Applicant's patent application U. S. Ser. No. 73,132, filed on Sept. 17, 1970, entitled PIEZOELECTRIC TRANSDUCER ELEMENTS.

BACKGROUND OF THE INVENTION

This invention relates to high voltage generating apparatus utilizing a piezoelectric transformer element, and more particularly to an improved high voltage generating device of compact construction suitable for use as the anode source of a cathode ray tube for television receivers.

In recent years, piezoelectric transformer elements which are easy to handle have been used widely to replace flyback transformers as the anode sources for cathode ray tubes of television receivers. The output of the piezoelectric transformer is rectified by a voltage step-up rectifier circuit to produce a high DC voltage. As this type of the high voltage generating apparatus generates a high voltage of several ten thousands volts, bulky insulations are required to insulate high voltage components. For this reason, it is impossible to miniaturize as desired the high voltage generating apparatus. As is well known in the art, it is necessary to support the piezoelectric transformer so as not to interfere with its mechanical vibration. But if metal supporting means are used, such metal parts cause electric discharge. To positively isolate component parts of high voltages, it has been proposed to dispose these component parts in independent compartments defined in a single casing but this construction renders difficult the assembly of the high voltage generating apparatus and involves many problems required to be solved.

SUMMARY OF THE INVENTION

It is therefore an object of this invention to provide a novel high voltage generating apparatus contained in a small casing and which is suitable for use as the anode source for cathode ray tubes of television receivers.

Another object of this invention is to provide a novel high voltage generating apparatus which can prevent electric discharge between component parts and can be assembled readily.

A further object of this invention is to provide a novel mounting construction for high voltage component parts such as the piezoelectric transformer.

In accordance with this invention, these and other objects can be attained by providing an AC circuit section including an input terminal, a piezoelectric transformer element and a rectifier connected between the output electrode of the piezoelectric transformer and the input terminal; a voltage step-up rectifier section connected to the output side of the AC circuit section; and a casing divided into two compartments by means of a partition wall of insulating material. The AC circuit section is mounted on one side of the partition wall and the rectifier circuit section on the opposite side. If desired, suitable sealing means may be provided between the inner surface of the casing and the partition wall to electrically insulate the AC circuit section and the voltage step-up rectifier circuit section. The sealing means for physically isolating each other said compartments may be constituted by a continuous groove around the periphery of the partition wall or on the inner surface of the casing and a rib formed on the inner surface of the casing or on the periphery of the partition wall to fit in the groove. Alternatively, the sealing means may comprise two upright walls or frames on the opposite surfaces of the partition wall to respectively surround the component parts of the AC circuit section and of the voltage step-up rectivier circuit section. These upright walls have a height sufficient to come into intimate contact with the inner surface of the casing, thus physically and electrically isolating the AC circuit section from the voltage step-up rectifier circuit section. According to a modified embodiment of this invention only certain high voltage component parts of the apparatus, particularly the rectifiers of the voltage step-up rectifier circuit section are surrounded by a upright wall. In this case, at least one vertical flexible finger is formed on the partition wall substantially in parallel with the outer surface of the upright wall to clamp the output lead wire of the high voltage generating apparatus between the finger and the upright wall. At least one projection is formed on the upper edge of the partition wall, and at least one perforation is formed through the upper wall of the casing to receive the projection. After assembly, the outer end of the projection is fused by heating to secure the partition wall to the casing.

Further, in accordance with this invention various means are provided to avoid local electrical discharge in the casing and to facilitate assembling operations. Thus for example, a recess of a suitable configuration is formed on the lower edge of the surface of the partition wall on which the AC circuit section is mounted and a pin is provided at nearly the center of the recess. A terminal board to which input terminals for the piezoelectric transformer element have been mounted and provided with an opening to receive the pin is received in the recess. After assembly, the outer end of the pin is fused by heating to secure the terminal board to the partition wall. Alternatively, the input terminals may be fastened to a pair of eyelets secured to a terminal board projecting from the lower edge of the partition wall on the surface on which the AC circuit section is mounted. The piezoelectric transformer element is resiliently mounted on the partition wall by utilizing a resilient clamping member in the form of a rectangular frame fitted over the transducer element at the nodal point of the mechanical vibration thereof and a pair of opposed supporting members having grooves to receive the supporting member. A plurality of pairs of such resilient clamping members of the number corresponding to the number of nodes may be provided along the length of the transducer element. Alternatively, a plurality of parallel grooves may be provided for the supporting members to adjust the position of the clamping member or to use a plurality of such clamping members.

BRIEF DESCRIPTION OF THE DRAWINGS

The invention can be more fully understood from the following detailed description taken in conjunction with the accompanying drawings in which.

DESCRIPTION OF THE PREFERRED EMBODIMENTS

Figure 1:
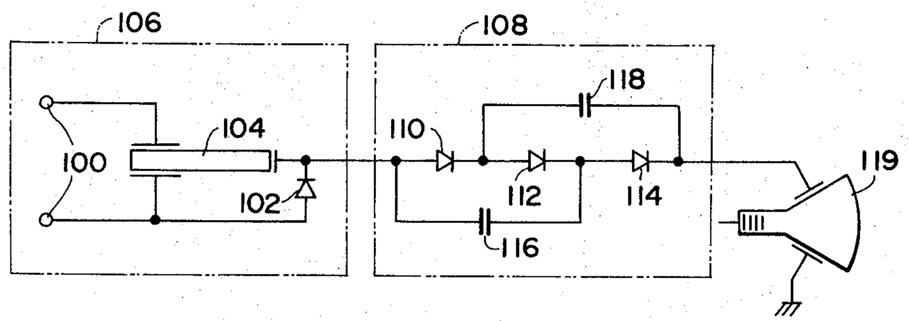
FIG. 1 shows a connection diagram of one example of a piezoelectric high voltage generating device.
Figure 2:
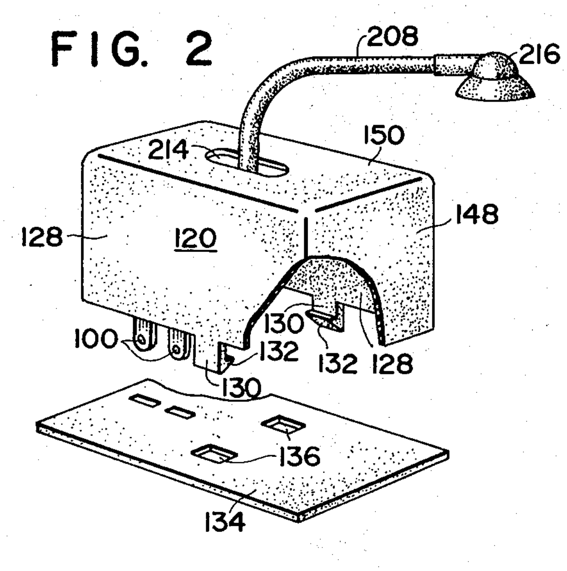
FIG. 2 is an exploded perspective view, partly broken away, of a high voltage generating apparatus embodying this invention.

Referring now to the accompanying drawings, FIG. 1 shows a connection diagram of a typical piezoelectric high voltage generating circuit comprising an AC circuit section including a piezoelectric transformer element 104, a pair of input terminals 100 connected to driving electrodes of the piezoelectric transformer element 104 and a rectifier 102 connected between the output electrode and one of the driving electrodes and a voltage step-up rectifier circuit section 108 connected to the output side of the AC circuit section 106. The rectifier circuit section 108 is shown as a type having a voltage step-up ratio of four and comprising three serially connected high voltage diodes 110, 112 and 114 and two high voltage capacitors 116 and 118 each connected across two diodes, as shown.

Strictly speaking, rectifier 102 should be included in the voltage step-up rectifier circuit section 108. However, in a high voltage generating apparatus, as it is convenient to classify the component parts according to their voltages, that is into relatively high voltage component parts and relatively low voltage component parts. In this description the low voltage rectifier 102 has been included in the AC circuit section 106.

In operation, upon application across input terminals 100 of a driving AC voltage having the same or nearly the same frequency as the frequency of the mechanical vibration of the piezoelectric element 104, a high AC voltage stepped-up by a factor of about 200 to 300 is generated at the output terminal of the piezoelectric transformer element 104. This high AC voltage is multiplied by a factor of four and rectified by the voltage step-up rectifier circuit 108 to provide a high DC voltage to a load, the anode electrode of a cathode ray tube 119, for example.

The detail of the novel high voltage generating apparatus will be described hereunder with reference to FIGS. 2 to 14. The high voltage generating apparatus comprises a casing 120 of rectangular cross-section and molded from a suitable insulating synthetic resin and an independent partition wall or an insulating plate 126 for defining two compartments 122 and 124 in the casing. The lower end of the casing is opened and a pair of depending flexible legs 130 are formed on the lower edges of two opposite side walls 128 of the casing. Each of the legs 130 is provided with a hook at its outer end. The legs are inserted into openings 136 of a printed substrate 134 to secure the casing to the substrate.

Figures 5, 6, 7:
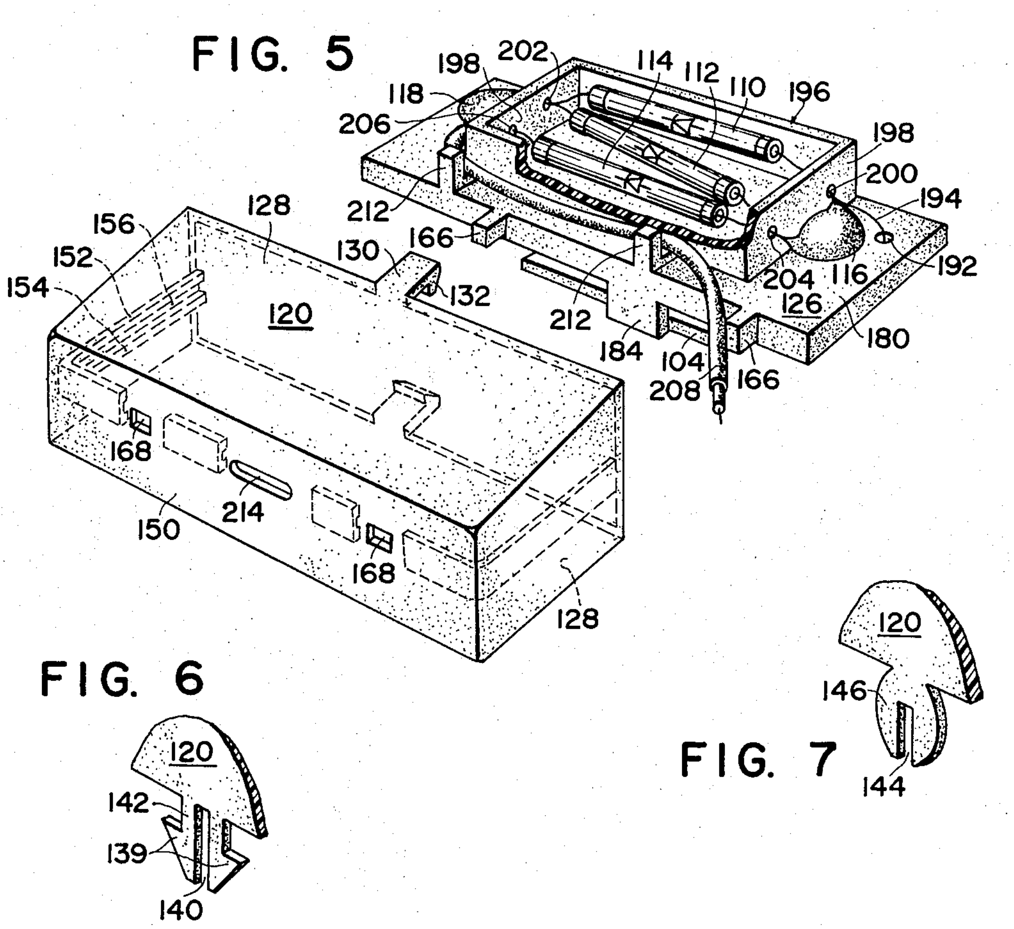
FIG. 5 is an exploded perspective view, partly in section, of the high voltage generating apparatus to show the detail of the side opposite to that shown in FIG. 4
FIG. 6 shows a modified leg.
FIG. 7 shows further modification of the leg.

FIG. 6 shows a modified construction of the leg. The leg 142 shown in this figure has a longitudinal slot 140 to provide the required resiliency to the leg and two lateral hooks 139. In another form shown in FIG. 7, the leg 146 is generally elliptical and is formed with a longitudinal slot 144 for the purpose of providing the required resiliency.

Figure 3:
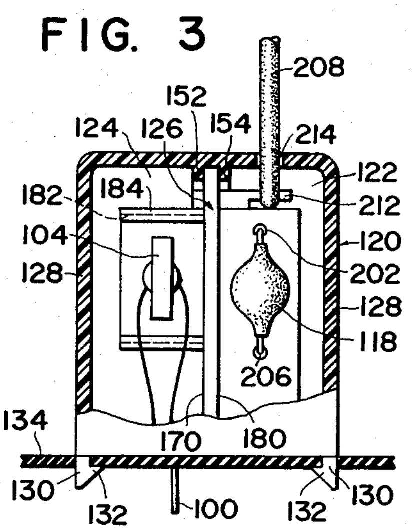
FIG. 3 shows an elevation, partly broken away of the voltage generating apparatus shown in FIG. 2.
Figure 4:
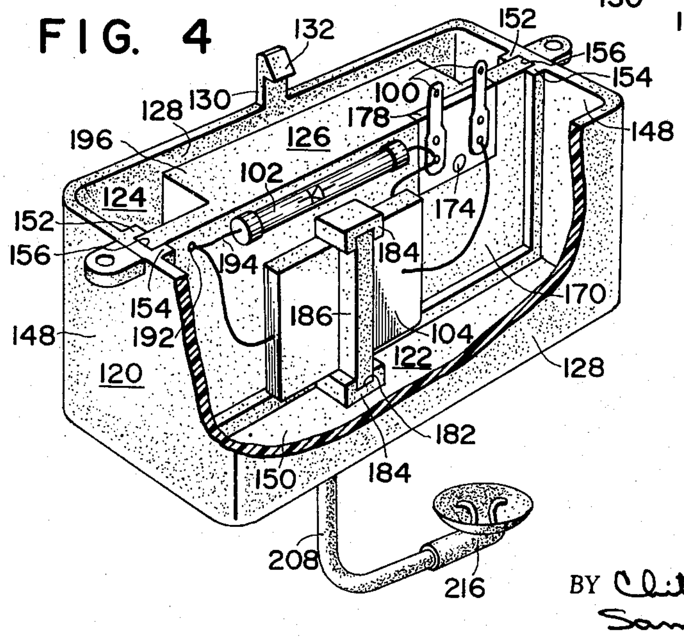
FIG. 4 is an inverted perspective view, partly broken away, to show the detail of the inside construction of the high voltage generating apparatus.

To electrically insulate compartments 122 and 124 sealing means are provided between the inner surface of the casing 120 and the partition wall 126. As shown in FIGS. 3 to 5, in this example, the sealing means comprises a pair of parallel ribs 152 and 154 extending along the inner surfaces of opposite side walls 148 and the inner central portion of upper wall 150 of casing 120. These parallel ribs define a groove 156 of rectangular cross-section there between, said groove being continuous around three edges of the partition wall 126. Thus, by inserting the partition wall 126 into groove 156 through the opened bottom of the casing 120, the partition wall completely isolates two compartments 122 and 124.

Figure 8:
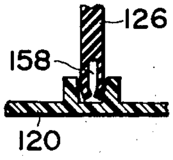
FIG. 8, 9 and 10 are partial sectional views showing different forms of sealing means between the partition wall and the casing.
Figure 9:
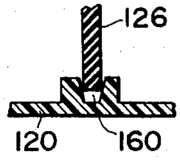
Figure 10:
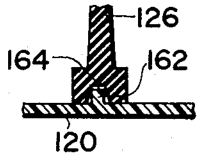

It is to be understood that various forms of the sealing means may be used, as shown in FIGS. 8 to 10 inclusive. In one example shown in FIG. 8, a slit 158 is formed around the periphery of the partition wall 126 to provide the required resiliency to the periphery of the partition wall 126 thus assuring snug fit between the partition wall 126 and the casing 120. In the form shown in FIG. 9, a groove 160 having a cross-section of a frusto-conical shape is formed to provide the required sealing between the edges of the partition wall and the groove 160. In the case shown in FIG. 10 a rib 162 of square cross-section formed on the inner surface of the casing 120 and a groove 164 for receiving the rib 162 is formed around the periphery of the partition wall.

The partition wall 126 is secured to the casing 120 by two projections 166 on the upper edge of the partition wall 126 and openings 168 through the upper wall 150 of the casing 120 for receiving these projections. More particularly, after insertion in the openings 168, the exposed ends of projections 166 are fused by means of heating by means of a soldering iron, for example, whereby the partition wall 126 is securely fastened to the casing 120.

Figure 11:
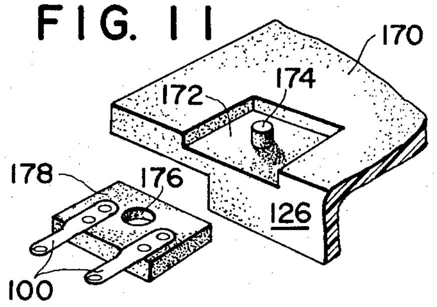
FIG. 11 is a partial perspective view showing the relationship between the partition wall and the input terminal board.

The component parts of the AC circuit section 106 shown in FIG. 1 are mounted on one surface 170 of the partition wall 126. More particularly, a rectangular recess 172 is formed at one end of the lower edge of the surface 170 of the partition wall 126 and a pin 174 is formed to project from the bottom of the recess, as best shown in FIG. 11. A thin terminal plate 178 of insulator 178 is provided having a size just to be received in the recess 172 and is formed with an opening 176 for receiving the pin 174. One end of a pair of input terminals 100 are secured to the outer surface of the terminal plate 178 as by molding. After mounting the terminal plate 178 in the recess 172, the exposed end of pin 174 is deformed by fusion, as by a soldering iron to fix the terminal plate 178 to the partition wall 126. This construction prevents the input terminals 100 from being exposed on the opposite surface 180 of the partition wall 126 whereby creation of electric discharge can be prevented.

Figure 12:
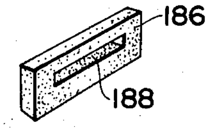
FIG. 12 shows a perspective view of an elastic band.
Figure 13:
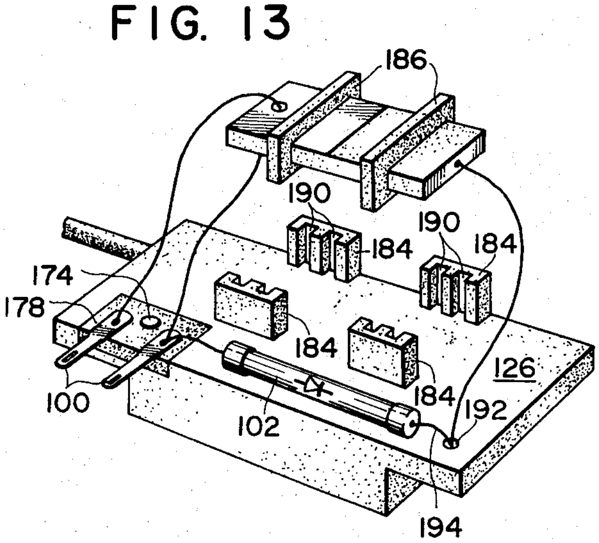
FIG. 13 is an exploded perspective view of a modified partition wall.

As best shown in FIG. 4, the piezoelectric transducer element 104 is secured to the surface 170 of the partition wall 126 by means of a pair of vertically spaced apart opposing supporting members 184 formed with grooves 182 on their opposing surfaces and a resilient clamping member 186 with its opposite ends received in the grooves 182. As shown in FIG. 12, the clamping member 186 takes the form of a rectangular frame of insulating rubber and is formed with an elongated slot 188 to accommodate the piezoelectric transformer element 104. The frame 186 is fitted on the nodal point of the mechanical vibratory motion of the piezoelectric transformer element 104, or when the element 104 is designed to undergo a vibration of the λ/2 mode, at the longitudinal center of the element 104 to resiliently support it so as not to interfere with the mechanical vibratory motion thereof. Further, as shown in FIG. 13, the supporting members 184 are disposed in pairs along the length of the piezoelectric transformer element 104. Alternatively, a plurality of grooves 190 may be provided for each supporting member. This construction permits use of a plurality of clamping members 136 to support a piezoelectric transformer element 104 operating at the λ mode or another modes having a plurality of nodal points. Further, selective utilization of a number of grooves, enables use of piezoelectric transformer elements of different length. The rectifier 102 of the AC circuit section 106 is positioned in parallel with and beneath the piezoelectric transformer element 104 and is supported by flexible conductors respectively connected to one of input terminals 100 and passed through an opening 192 through one end of the partition wall on the side opposite the input terminals. The output lead wire 194 of the rectifier 102 and the lead wire connected to the output electrode of the piezoelectric transformer element 104 are passed through the opening 192 to the opposite surface 180 of the partition wall 126.

As best shown in FIG. 5, the component parts of the voltage step-up rectifier circuit section 108 are mounted on the surface 180 of the partition wall 126. More particularly, the surface 180 is surrounded by an upstanding wall 196 in the form of a rectangular frame and the high voltage rectifiers 110, 112 and 114 of the voltage step-up rectifier circuit section 108 are contained in the space surrounded by the upstanding wall 196 while high voltage capacitors 116 and 118 of the high voltage rectifier circuit section 108 are mounted on the surface 180 outside the end walls 198 of the upstanding wall 196. High voltage rectifiers 110, 112 and 114 and high voltage capacitors 116 and 118 are connected according to the connection diagram shown in FIG. 1 by conductors extending through four perforations 200, 202, 204 and 206 through end walls 198 and an output lead wire shown as an anode lead wire 208 is connected to the output end of the voltage step-up rectifier circuit section 108. In this manner, high voltage rectifiers 110, 112 and 114 are isolated from other circuit components by the upstanding wall 196 surrounding them, thus preventing undesirable discharge in the casing 120.

A pair of flexible fingers 212 are formed on the partition wall 126 on the outside of the upright wall 196 and in parallel therewith. The spacing between fingers 212 and the upright wall 196 is made slightly smaller than the outer diameter of the anode lead wire 208 so that the lead wire 208 is resiliently held in position when it is forced into the gap between fingers 212 and upright wall 196. Anode lead wire 208 is lead out to the outside of the casing 120 through an opening 214 through the top wall 150 of the casing. A plug 216 is connected to the outer end of the lead wire 208 for connection with the anode electrode of the cathode ray tube 119.

Figure 15:
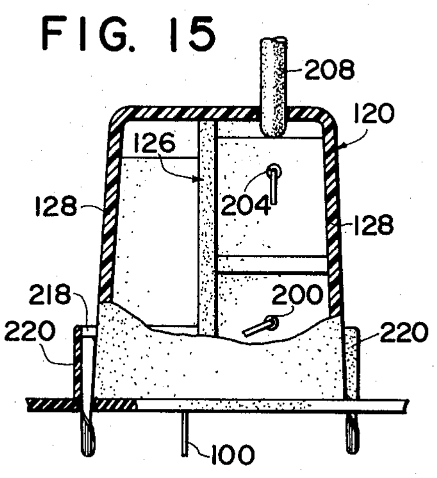
FIG. 15 is a front view, partly broken away, of the apparatus shown in FIG. 14.
Figure 16:
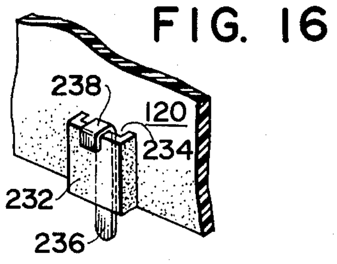
FIG. 16 is a partial perspective view of a modified mounting fixture.
Figure 14:
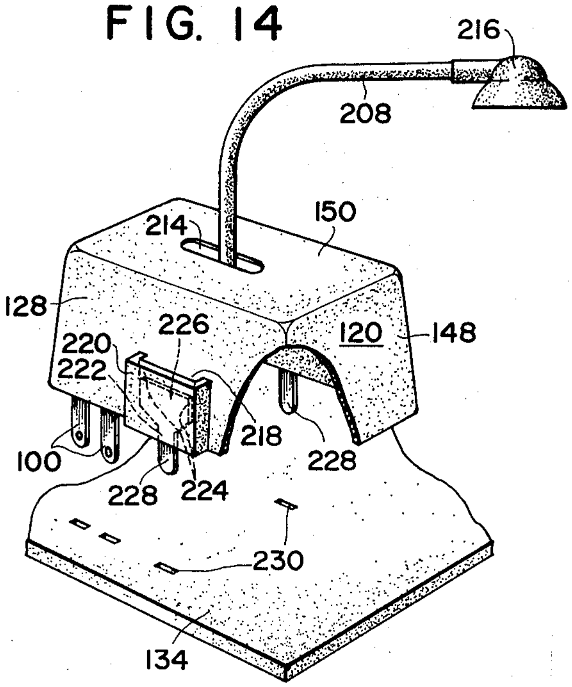
FIG.14 is an exploded perspective view, partly broken away, of a modified high voltage generating apparatus.
Figure 17:
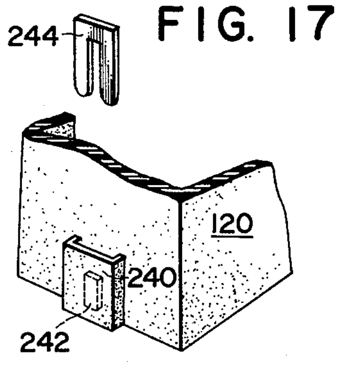
FIG. 17 is a similar view of another form of the mounting fixture.

FIGS. 14 to 19 inclusive show a modified embodiment of this invention. Portions corresponding to those of the previous embodiment are designated by the same reference numerals for the sake of description. Casing 120 is secured to the substrate 134 by a mounting fixture of the different construction. A pair of channel shaped auxiliary walls 220 are formed integrally with casing 120 on the bottom portion of the outer surfaces of opposite side walls 128 of the casing 120 to form pockets 218 between auxiliary walls 220 and side walls 218. Each of the pockets 218 has a narrow opening 222 at its bottom. A metal fastener 226 having wings 224 on both sides of the upper portion thereof is received in each pocket 218 and the lower leg or tongue 228 of the fastener extends through narrow opening 222 beyond the lower end of casing 120 to be received in an opening 230 formed through the substrate 134. The projecting ends of the tongues 228 are deformed or twisted as shown in FIG.15 by means of a suitable tool to fasten the casing 120 to the printed substrate 134. Alternatively, the casing may be secured to the substrate by modified fasteners as shown in FIGS. 16 or 17. In the form shown in FIG.16 a metal fastener 236 in the form of a letter L or a hook is inserted through an opening 234 bounded by an auxiliary wall 232 with the upper end of the fastener engaged the upper edge of the auxiliary wall 232. In the form shown in FIG.17 a projection 242 is formed on the inner wall of the auxiliary wall 240 and a hair pin shaped fastener 244 is inserted in the pocket to engage the upper edge of the projection 242.

The modified embodiment shown in FIGS. 14 to 19 employs sealing means different from that utilized in the first embodiment shown in FIGS. 2 to 13. More particularly, the piezoelectric transformer element 104 mounted on the surface 170 of the partition wall 126 is surrounded by a upright wall 246 in the form of a rectangular frame. Component parts of the voltage step-up rectifier circuit section 108 mounted on the opposite surface 180 are surrounded by a upright wall in the form of a rectangular frame having a length slightly shorter than the length of the partition wall 126. As shown in FIG.15, upright walls 246 and 248 have sufficient height to closely engage the inner surfaces of respective side walls 128 of the casing 120. In this manner, side walls 128 of the casing 120 and both upright walls 246 and 248 cooperate with each other to physically and electrically isolate the piezoelectric transformer element 104, rectifier 102 and component parts of the voltage step-up rectifier circuit section between which electric discharges are liable to occur. Thus it is possible to contain these component parts in the same casing 120 without the fear of discharge.

Figure 18:
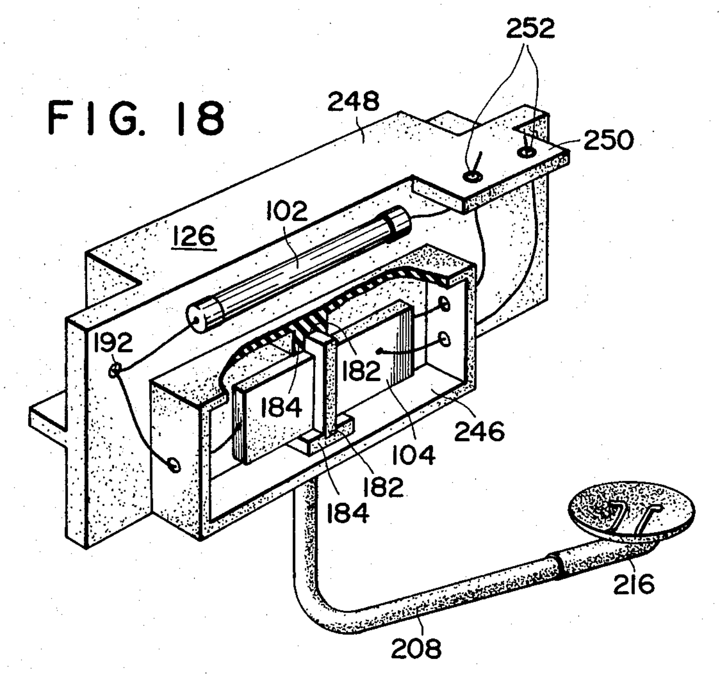
FIG. 18 is a perspective view, as viewed from one side, of the partition wall utilized in the high voltage generating apparatus shown in FIGS. 14 and 15.

FIG.18 illustrates a modified terminal mounting fixture. More particularly, a small terminal board 250 is formed integral with the partition wall 126 on the lower edge thereof and on the surface 170. A pair of eyelets 252 are secured to the terminal board 250 to receive input terminals. This construction permits the use of the inlet terminals in the form of eyelets without distrubing electric insulating strength on the opposite sides of the partition wall 126, thus facilitating the assembly of the high voltage generating apparatus.

Figure 19:
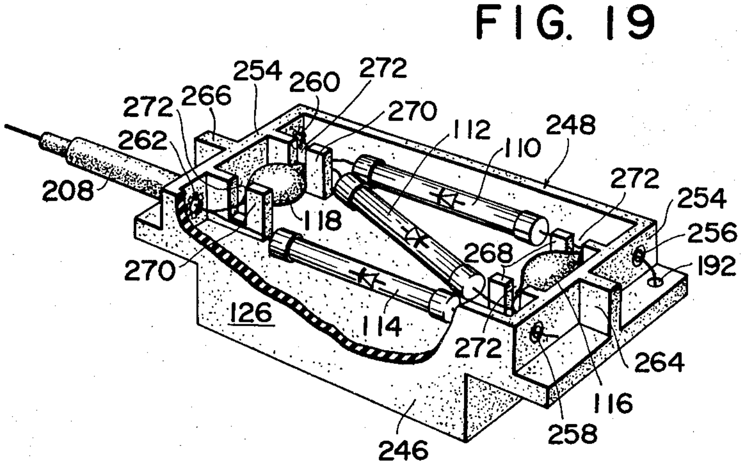
FIG. 19 is a perspective view, as viewed from the opposite side, of the same partition wall.

FIG.19 illustrates a construction for preventing local discharges between component parts of the voltage step-up rectifier circuit section 108 mounted on the surface 180 of the partition wall 126. Four eyelets 256, 258, 260 and 262 are secured through opposite end walls 254 of the upright wall 248 of the partition wall 126 to receive lead wires between various components parts. Vertical barriers 264 and 266 are formed integrally with the end walls 254 on the outer surfaces thereof between adjacent eyelets 256 and 258 and 260 and 262 to isolate them from each other. Two pairs of vertical barriers 268 and 270 are formed on the inner surface of the end walls 254 of the upright wall 248 in parallel with barriers 264 and 266 and close to eyelets 256, 258, 260 and 262. Each of the inner barriers 268 and 270 is provided with a vertical slot 272 to receive lead wires of high voltage capacitors 116 and 118 of the voltage step-up rectifier circuit section 108. With this construction, adjacent eyelets of the rectifier circuit section 108 are efficiently isolated from each other by the inner and outer barriers 268, 270 and 264, 266, thus preventing local discharge between eyelets.

As above described, according to this invention it is possible not only to prevent electric discharges between the AC circuit section and the voltage step-up rectifier section but also to prevent local discharges between various component parts of the circuit whereby it is possible to compactly assemble the piezoelectric transducer type high voltage generating circuit in a casing of small size.

While in the foregoing examples, the high voltage generating apparatus have been used as the anode source for cathode ray tubes of television receivers it is clear that the novel high voltage generating apparatus can also be used for another applications. The voltage step-up rectifier circuit can be replaced by any one of various well known rectifying circuits. Thus, it is to be understood that many changes and modifications may be made without departing from the true spirit and scope of the invention as defined in the appended claims.

What is claimed is:

1. A high voltage generating apparatus comprising a piezoelectric high voltage generating circuit having an AC circuit section including an input terminal, a piezoelectric transformer element, and a rectifier connected between said input terminal and the output electrode of said piezoelectric transformer element; a voltage step-up rectifier circuit section connected to the output side of said AC circuit section; a casing of insulator having an opened bottom; an insulator partition wall positioned in said casing to divide the interior thereof into two compartments; said AC circuit section being mounted on one surface of said partition wall and said voltage step-up rectifier circuit section on the other surface of said partition wall; and, sealing means provided between the inner surface of said casing and the periphery of said partition wall to electrically isolate said AC circuit section from said voltage step-up rectifier circuit section, said sealing means comprising a continuous groove formed around the periphery of said partition wall and a rib formed on the inner surface of said casing and received in said groove.

2. A high voltage generating apparatus comprising a piezoelectric high voltage generating circuit having an AC circuit section including an input terminal, a piezoelectric transformer element, and a rectifier connected between said input terminal and the output electrode of said piezoelectric transformer element; a voltage step-up rectifier circuit section connected to the output side of said AC circuit section; a casing of insulator having an opened bottom; an insulator partition wall positioned in said casing to divide the interior thereof into two compartments; said AC circuit section being mounted on one surface of said partition wall and said voltage step-up rectifier circuit section on the other surface of said partition wall; and, a first upright wall in the form of a frame provided on one surface of said partition wall to surround at least a portion of said AC circuit section; and a second upright wall in the form of a frame provided on the opposite surface of said partition wall to surround said voltage step-up rectifier circuit section, said first and second upright walls having sufficient height to come into intimate contact with the inside surfaces of said casing whereby to electrically and physically isolate said AC circuit section from said voltage step-up rectifier circuit section.

3. The high voltage generating apparatus according to claim 2 wherein said second upright wall for surrounding said voltage step-up rectifier circuit section includes a plurality of eyelets for mounting the component parts of said voltage step-up rectifier circuit section and said partition wall is provided with a plurality of barriers for isolating adjacent eyelets.

4. The high voltage generating apparatus according to claim 2 wherein said partition wall is provided with at least one flexible finger located on the outside of said second upright wall surrounding said voltage step-up rectifier circuit section and extending vertically substantially in parallel with the outer surface of said second upright wall, whereby the output lead wire of said high voltage generating circuit is resiliently supported in a space between said finger and said second upright wall.

5. A high voltage generating apparatus comprising a piezoelectric high voltage generating circuit having an AC circuit section including an input terminal, a piezoelectric transformer element, and a rectifier connected between said input terminal and the output electrode of said piezoelectric transformer element; a voltage step-up rectifier circuit section connected to the output side of said AC circuit section; a casing of insulator having an opened bottom; an insulator partition wall positioned in said casing to divide the interior thereof into two compartments; said AC circuit section being mounted on one surface of said partition wall and said voltage step-up rectifier circuit section on the other surface of said partition wall; the upper edge of said partition wall being provided with at least one projection and the upper wall of said casing being provided with at least one perforation to accommodate said projection, the end portion of said projection being adapted to project beyond said perforation and to be fused by heating to secure said partition wall to said casing.

6. A high voltage generating apparatus comprising a piezoelectric high voltage generating circuit having an AC circuit section including an input terminal, a piezoelectric transformer element, and a rectifier connected between said input terminal and the output electrode of said piezoelectric transformer element; a voltage step-up rectifier section connected to the output side of said AC circuit section; a casing of insulator having an opened bottom; an insulator partition wall positioned in said casing to divide the interior thereof into two compartments; said AC circuit section being mounted on one surface of said partition wall and said voltage step-up rectifier circuit section on the other surface of said partition wall; an input terminal mounting fixture including a recess formed on the surface of said partition wall on which said AC circuit section is mounted; a pin provided substantially at the center of said recess; and an insulating board carrying a pair of input terminals for said piezoelectric transformer element and provided with a perforation for receiving said pin, the outer end of said pin being adapted to be deformed by heating after mounting said terminal board in said recess whereby said terminal board is securely fixed to said partition wall.

7. A high voltage generating apparatus comprising a piezoelectric high voltage generating circuit having an AC circuit section including an input terminal, a piezoelectric transformer element, and a rectifier connected between said input terminal and the output electrode of said piezoelectric transformer element; a voltage step-up rectifier circuit section connected to the output side of said AC circuit section; a casing of insulator having an opened bottom; and an insulator partition wall positioned in said casing to divide the interior thereof into two compartments; said AC circuit section being mounted on one surface of said partition wall and said voltage step-up rectifier circuit section on the other surface of said partition wall; and sealing means provided between the inner surface of said casing and the periphery of said partition wall to electrically isolate said AC circuit section from said voltage step-up rectifier circuit section, said sealing means comprising a continuous groove formed on the inner surface of said casing and a rib formed on the periphery of said partition wall and received in said groove, said rib having a slit extending along the periphery of said partition wall so that the end of said rib may be deformed to be resiliently fit into said groove.

8. A high voltage generating apparatus comprising a piezoelectric high voltage circuit having an AC circuit section including an input terminal, a piezoelectric transformer element, and a rectifier connected between said input terminal and the output electrode of said piezoelectric transformer element; a voltage step-up rectifier circuit section connected to the output side of said AC circuit section; a casing of insulator having an opened bottom; an insulator partition wall positioned in said casing to divide the interior thereof into two compartments; said AC circuit section being mounted on one surface of said partition wall and said voltage step-up rectifier circuit section on the other surface of said partition wall; at least one resilient insulating clamping member in the form of a frame having a rectangular opening, the four sides of which said piezoelectric element is adapted to contact, said piezoelectric element being enclosed by and solely supported by said frame at its node of mechanical vibratory motion; and a pair of spaced apart opposed supporting members secured to said partition wall, each of said supporting members having at least one groove to receive said clamping member and to thereby support said clamping member from said wall.

* * * * *